US006780257B2

(12) United States Patent
Nagata et al.

(10) Patent No.: US 6,780,257 B2
(45) Date of Patent: Aug. 24, 2004

(54) IRON COMPONENT AND A MANUFACTURING METHOD THEREFOR

(75) Inventors: Tsuyoshi Nagata, Fujisawa (JP); Hiroyasu Tsuchida, Fujisawa (JP); Yoshio Uematsu, Fujisawa (JP); Kiyoshi Satoh, Fujisawa (JP); Kosuke Tamaru, Sagamihara (JP)

(73) Assignees: IBM Japan Ltd., Tokyo (JP); NHK Spring Co., Ltd., Yokohama (JP)

( * ) Notice: Subject to any disclaimer, the term of this patent is extended or adjusted under 35 U.S.C. 154(b) by 146 days.

(21) Appl. No.: 10/051,718

(22) Filed: Jan. 17, 2002

(65) Prior Publication Data

US 2002/0117023 A1 Aug. 29, 2002

(30) Foreign Application Priority Data

Feb. 28, 2001 (JP) ...................................... 2001-055103

(51) Int. Cl.[7] ................................................. C21D 9/00

(52) U.S. Cl. ....................... 148/320; 148/325; 148/625; 148/635; 148/606; 148/634

(58) Field of Search ................................ 148/625, 635, 148/634, 606, 320, 325

(56) References Cited

FOREIGN PATENT DOCUMENTS

JP 7-102379 4/1995

OTHER PUBLICATIONS

English abstract of Japanese patent 2001079749, Osgi, Makoto et al., Mar. 27, 2001.*

English abstract of European patent 1084785, Osugi, Ryo et al., Mar. 21, 2001.*

* cited by examiner

*Primary Examiner*—Deborah Yee
(74) *Attorney, Agent, or Firm*—Scully, Scott Murphy & Presser

(57) ABSTRACT

A base plate of a stainless-steel body material formed by pressing is polished and cleared of burrs by means of an abrasive material that consists mainly of $Fe_2O_3$ in a polishing process. The polished base plate is heated to a heat treatment temperature for solid solution in a reducing atmosphere in a heat treatment process. In this heat treatment process, an oxide in the constituents of minute fragments of the abrasive material in the surface of the body material of the base plate is reduced to leave iron, which is dispersed into the body material.

6 Claims, 4 Drawing Sheets

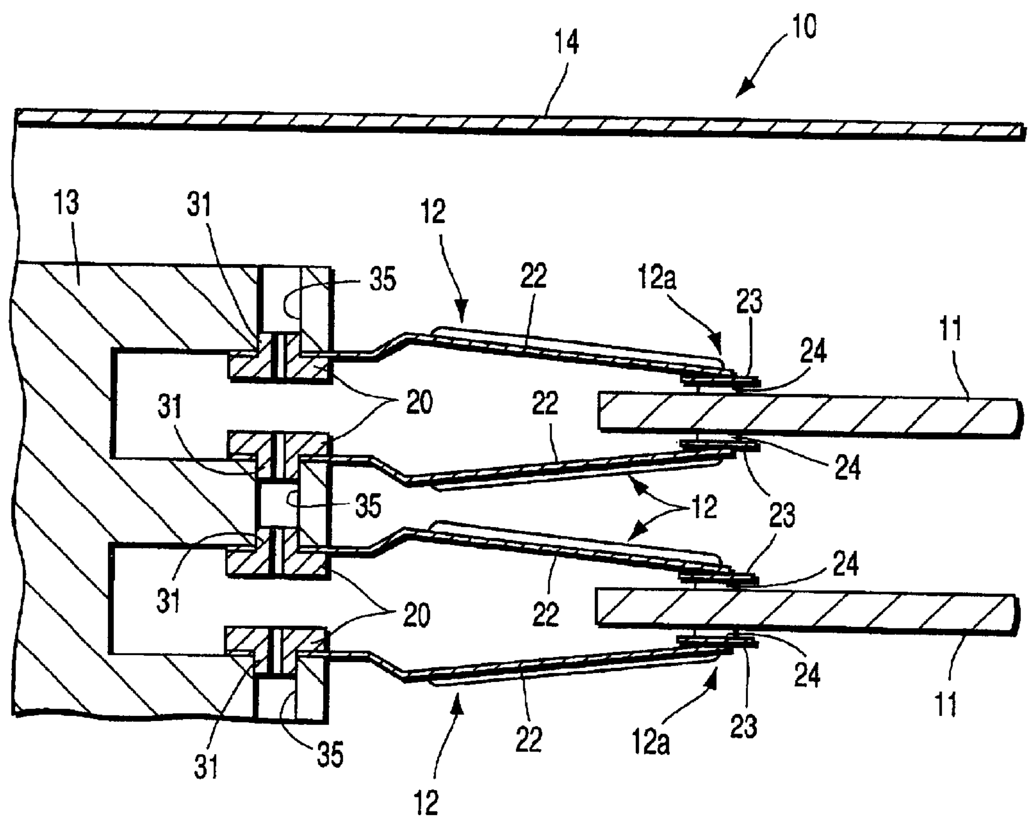
F I G. 1
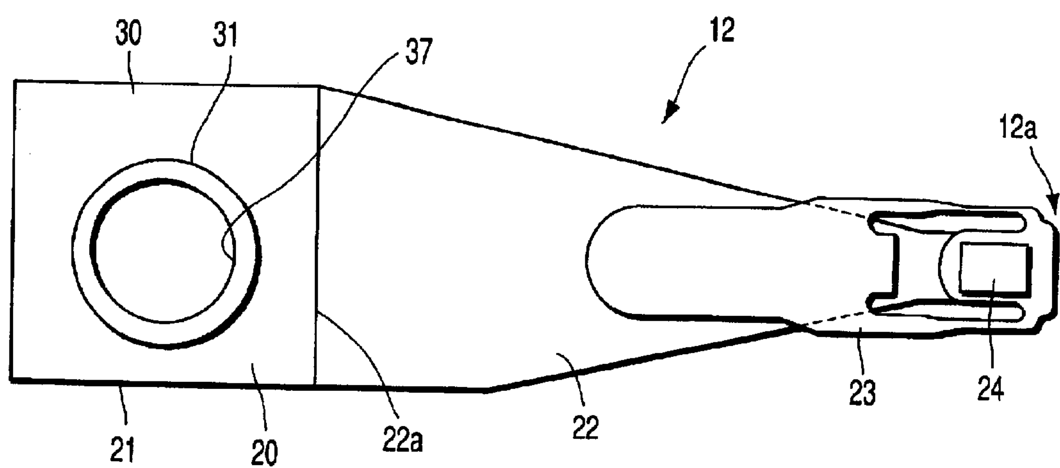
F I G. 2

IRON COMPONENT AND A MANUFACTURING METHOD THEREFOR

CROSS-REFERENCE TO RELATED APPLICATIONS

This application is based upon and claims the benefit of priority from the prior Japanese Patent Application No. 2001-055103, filed Feb. 28, 2001, the entire contents of which are incorporated herein by reference.

BACKGROUND OF THE INVENTION

1. Field of the Invention

The present invention relates to an iron component used in a built-in disc drive of a personal computer or the like and a manufacturing method therefor.

2. Description of the Related Art

A hard disc drive (HDD) that is used in information processing equipment, such as a personal computer, comprises a disc that is rotated by means of a motor and a carriage that is provided with a head portion for recording in and reading data from the disc. The carriage is turned around a shaft by means of a positioning motor. The carriage includes an actuator arm, a suspension attached to the distal end portion of the actuator arm, the head portion provided on the distal end portion of the suspension, etc. The head portion is provided with a slider.

When the slider is slightly lifted above the surface of the disc as the disc rotates, an air bearing is formed between the disc surface and the slider. The suspension includes a base portion having a base plate, a load beam formed of a precision leaf spring, a flexure fixed to the load beam, and the like. The base plate (mount plate), which is formed of a ferrous metal such as austenitic stainless steel, is formed in a given shape by pressing.

In some cases, burrs may be formed on the shear surface of a component (e.g., base plate) that is formed by machining such as pressing. Since these burrs lower the flatness of the component or fall off, thereby producing particles, they should be removed. Barrel finishing is a known polishing method for removing the burrs. For the barrel finishing, a large number of components, objects to be polished, are stored together with abrasive grains called media in a polishing tank.

The surface of each object is polished by means of the abrasive grains as the polishing tank is rotated. Various known materials are used for the abrasive grains depending on the purposes. Rigid abrasive grains formed of alumina, silicone, or other oxides can be effectively used to remove burrs on stainless-steel components such as the base plate.

The oxide-based abrasive grains are rigid enough to remove the burrs effectively. On the other hand, minute fragments of the abrasive grains are supposed to be stuck in the surface of each component. Possibly, the fragments of the abrasive grains in the surface of the component may remain in the component surface, failing to be removed by cleaning that follows polishing, and form contaminants. If minute fragments (or particles) of the abrasive grains of several micrometers fall from the surface of the base plate during use of a disc drive (or operation of a computer), the particles may possibly get into the space between the disc and the slider. These particles may exert a bad influence upon the performance of the disc drive.

In order to prevent the particles from falling off (or from producing contaminants), the possibility of contaminants production may be lowered by thoroughly cleaning the polished component by ultrasonic cleaning or the like, thereby removing as many particles that can fall off as possible. However, even the thoroughgoing ultrasonic cleaning cannot entirely remove the particles that are stuck in the surface of the component. Alternatively, the particles in the component surface may be removed by chemical polishing. Essentially, however, the chemical polishing is a process in which the whole surface of a component is melted down. Thus, the chemically polished component is subject to variation in dimensions, and the addition of the process results in an increase in cost.

BRIEF SUMMARY OF THE INVENTION

The object of the present invention is to provide a high-cleanness iron component restrained from producing dust and a manufacturing method therefor.

An iron component according to the present invention comprises an iron body material formed having a given shape and polished, an oxide in the constituents of fragments of an oxide abrasive material in and near the surface of the body material being reduced so that iron is dispersed into the body material. According to this invention, production of dust after polishing can be restrained, so that the iron component obtained is highly clean. In this specification, "iron component" is a stainless-steel component that is used in a disc drive, for example.

More specifically, an example of the iron component is a component for disc drive, such as a base plate of a suspension for disc drive formed of austenitic stainless steel or a dummy head (dummy component equivalent to a suspension in mass). In a disc drive in which production of particles in a casing must be minimized, according to this invention, particles can be restrained from falling from the stainless-steel component into the casing, so that the interior of the disc drive can be kept highly clean. However, the invention is applicable to any other precision components than the disc drive that require high cleanness. In this specification, "iron" is a steel material that contains 50% or more of Fe (iron element). Further, "reduction" results in a state in which equivalence of the oxygen concentration to that of the body material can be recognized by surface characterization such as EDX. "Reducing atmosphere" is a concept that covers a vacuum.

A manufacturing method for an iron component according to the present invention comprises a polishing process of polishing the surface of an iron body material having a given shape by means of an abrasive material containing ferric oxide, and a heat treatment process of heating the body material in a reducing atmosphere after the polishing process, thereby reducing an oxide in the constituents of fragments of the abrasive material in and near the surface of the body material and leaving iron, and keeping the body material at a temperature for dispersion, thereby dispersing the iron into the body material. The temperature for the heat treatment ranges from 300° C. to 1,540° C. In the case of stainless steel, in particular, the suitable heat treatment temperature ranges from 800° C. to 1,100° C.

According to the manufacturing method of this invention, burrs on the iron component can be effectively removed by means of the oxide abrasive material, and the fragments of the abrasive material and fragments of the body material can be extinguished by heat treatment for dispersion that is carried out in the reducing atmosphere after the polishing. Thus, the iron component obtained is highly clean.

The conditions in which the fragments of the abrasive material formed of ferric oxide can be extinguished by the heat treatment depend on the reducing atmosphere of hydrogen and the heat treatment temperature. Hydrogen has reducibility such that it can maintain the surface of a ferrous metal without oxidizing or exerting any influence upon the metal and reduce oxides. Accordingly, the fragments of the abrasive material formed of ferric oxide that are adhered to or stuck in the surface of the iron body material are reduced to Fe in the reducing atmosphere, and the resulting Fe is dispersed into the iron body material (e.g., austenitic stainless steel). Thereupon, the fragments of the abrasive material in the surface of the iron body material disappear.

The heat treatment process according to the present invention serves highly effectively to restrain production of particles from the component of austenitic stainless steel. However, it also serves to restrain production of particles from iron components of various other steel materials including martensitic stainless steel, ferritic stainless steel, etc. Further, the present invention is applicable to any other iron components than the disc drive, not to mention dummy heads or other iron components that are incorporated in disc drives as well as base plates of suspensions for disc drive.

The polishing process according to the invention may be any other processes than barrel finishing, such as ones based on shot blasting or a lapping machine. In short, the polishing process is a process using an abrasive material that consists mainly of ferric oxide. If any of minute fragments of the abrasive material or fragments of the body material that are produced by the polishing may possibly be adhered to or stuck in the body material, the aforesaid process of heat treatment in the reducing atmosphere serves very effectively to restrain production of particles or dust.

According to the present invention, the iron component that is restrained from producing dust by the heat treatment in the reducing atmosphere is incorporated in the casing of a hard disc drive or the like in which production of dust in the casing must be minimized. Thus, the reliability of the hard disc drive or other device can be improved effectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a sectional view of a part of a disc drive including a suspension with a base plate according to one embodiment of the present invention;

FIG. 2 is a plan view of the suspension shown in FIG. 1;

DETAILED DESCRIPTION OF THE INVENTION

Figure 3:
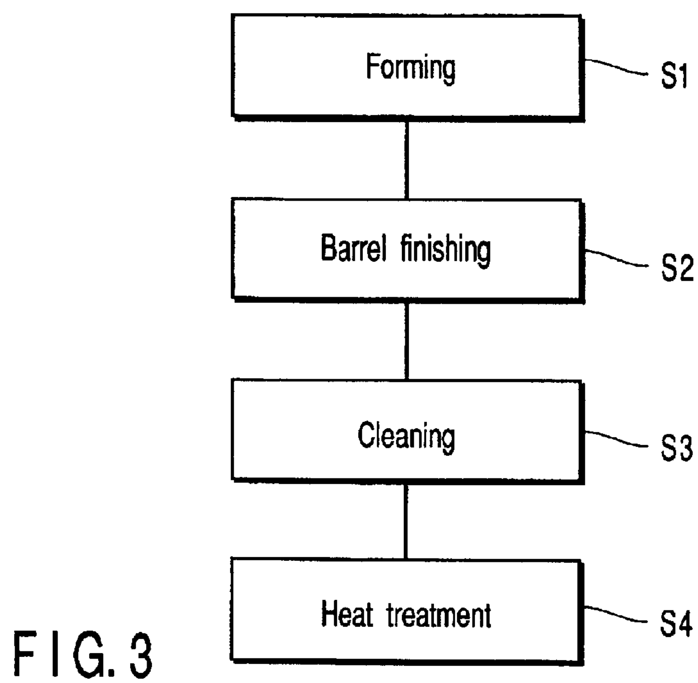
FIG. 3 is a flowchart showing processes for manufacturing the base plate of the one embodiment of the invention.

One embodiment of the present invention will now be described with reference to FIGS. 1 to 8.

A hard disc drive 10 shown in FIG. 1 comprises suspensions 12, an actuator arm 13, etc. Each suspension 12 is provided with a head portion 12*a* for recording on or reading information from a recording surface of a disc 11 for use as a recording medium. The actuator arm 13 is an example of an arm member to which the suspensions 12 are attached. The arm 13 is turned around a shaft (not shown) by means of a positioning motor (not shown). The suspensions 12 and the actuator arm 13 are housed in a closed casing 14 (only part of which is shown).

FIG. 2 shows an example of one such suspension 12 for disc drive. The suspension 12 comprises a base portion 21 including a base plate 20, a load beam 22 extending from the base portion 21 to the head portion 12*a*, a flexure 23 attached to the load beam 22, and the like. The load beam 22 is formed of a springy material. The flexure 23 is formed of a leaf spring that is thinner than the load beam 22. A slider 24 that forms the head portion 12*a* is attached to the distal end portion of the flexure 23.

The base plate 20 is formed of austenitic stainless steel (Fe—Cr—Ni) with a thickness of about 200 μm, for example. The base plate 20 is fixed to a proximal portion 22*a* of the load beam 22 by laser welding in a manner such that it is superposed on the proximal portion 22*a*. The base plate 20 includes a plate body portion 30 superposed on the load beam 22 and a boss portion 31 in the form of a short cylinder formed by a forming process such as pressing. The boss portion 31 is inserted in a mounting hole 35 (shown in FIG. 1) in the actuator arm 13.

As shown in FIG. 3, by way of example, a method for manufacturing the base plate 20 includes a forming process S1, barrel finishing process S2, cleaning process S3, heat treatment process S4, etc. In the forming process S1, the base plate 20 is formed into a given shape by pressing. As this is done, burrs may be formed on the inner peripheral edge of a hole of the boss portion 31 or the outer peripheral edge of the plate body portion 30, for example, in some cases. These burrs can be removed in the barrel finishing process S2, which will be described below.

Figure 4:
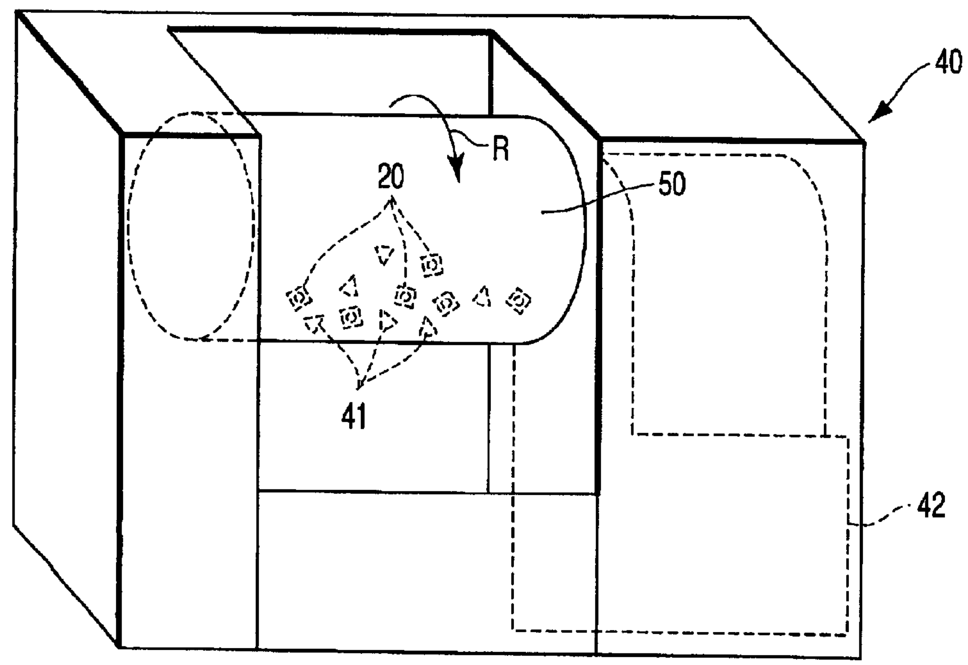
FIG. 4 is a perspective showing an outline of a barrel finishing apparatus.

In the barrel finishing process S2, an object to be polished (e.g., base plate 20) is barrel-finished by means of a barrel finishing apparatus 40 shown in FIG. 4. Abrasive grains (oxide media) 41 that consist mainly of ferric oxide ($Fe_2O_3$) are used in this process S2.

Figure 5A:
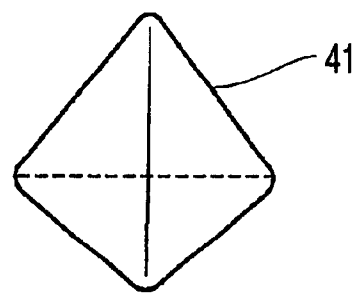
FIG. 5A is a perspective view showing an example of an abrasive grain.
Figure 5B:
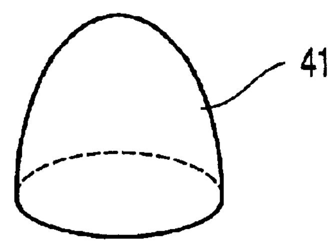
FIG. 5B is a perspective view showing another example of the abrasive grain.

Each abrasive grain 41, which may be of any shape, may be polyhedral, as shown in FIG. 5A, or of the shape shown in FIG. 5B. The abrasive grains 41 are obtained by sintering powder of ferric oxide together with an organic binder. For example, each abrasive grain 41 contains about 60% by weight of Fe as well as carbon and oxygen.

The barrel finishing apparatus 40 is provided with a cylindrical polishing tank 50. The tank 50 is stored with a large number of objects to be polished (e.g., base plates 20), a large number of abrasive grains 41, and water and additives as required. A motor 42 is used to rotate the tank 50 in the direction of arrow R in FIG. 4. By doing this, the to-be-polished objects (e.g., base plates 20) are polished by means of the abrasive grains 41 so that their burrs are removed. The abrasive grains 41, formed of ferric oxide, have micro Vickers hardness as high as about 500 (Hv), for example, so that burrs on stainless-steel objects to be polished can be removed thoroughly.

Figure 6:
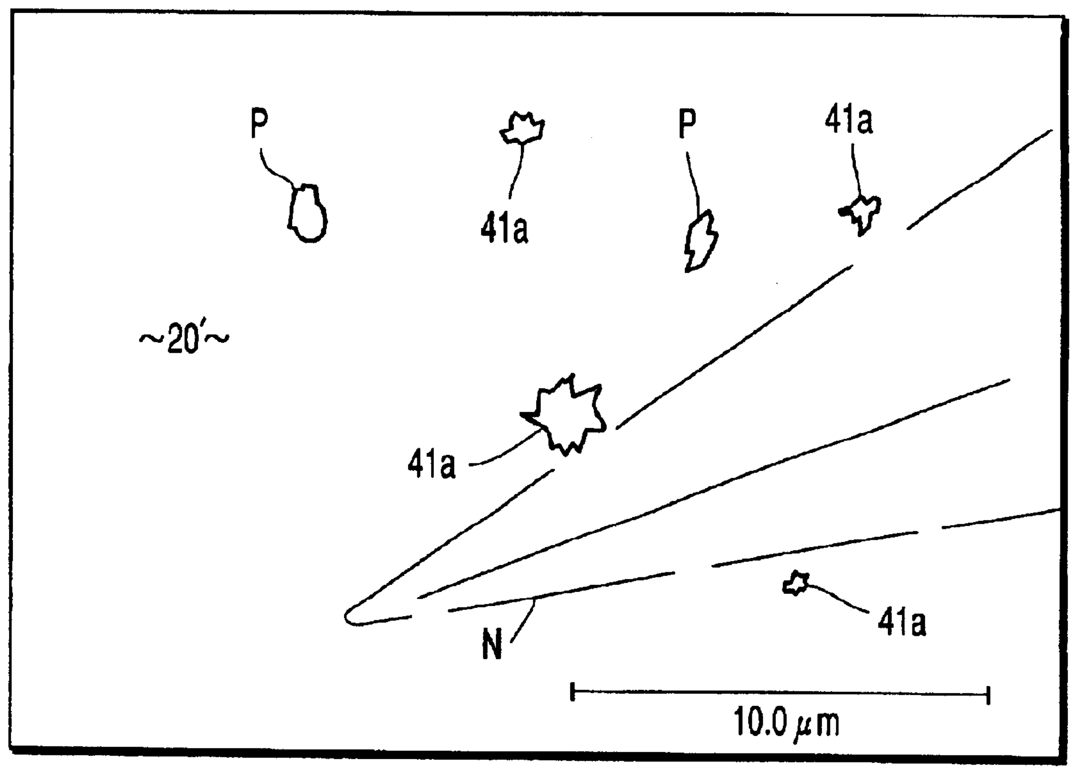
FIG. 6 is an enlarged view showing the surface of a polished body material before heat treatment.

When a part of each polished object (e.g., base plate 20) was magnified 4,000 times by means of a microscope, minute fragments 41*a* of the abrasive grains 41 were observed, as shown in FIG. 6. In this case, the minute fragments 41*a* of the abrasive grains 41 and fragments P of a body material 20' were adhered to or stuck in the surface of the body material 20'. In order to disperse the fragments 41*a* and P, the body material 20' was heated in a reducing atmosphere of hydrogen in the heat treatment process S4. By doing this, an oxide in the constituents (ferric oxide constituents) of the fragments 41*a* of the abrasive grains 41 in the surface of the body material 20' was reduced to leave iron. The iron and the fragments P of the body material were able to be dispersed into the body material 20' at a maintained temperature for dispersion.

More specifically, heat treatment for solid solution was carried out in a hydrogen atmosphere at about 1,040° C. in the heat treatment process S4, and the resulting solid solution was cooled thereafter. By way of example, a to-be-polished object of SUS304L was polished by means of oxide media that were obtained by sintering grains with diameters of 3 to 6 μm, and then heat-treated at a heat treatment temperature of 1,040° C. and with a dew point of −70° C. in a reducing atmosphere of pure hydrogen.

In the heat treatment process S4, oxygen, a constituent of ferric oxide ($Fe_2O_3$) of the fragments 41*a* of the abrasive grains 41 having so far been in the surface of the body material 20', combined with hydrogen in the reducing atmosphere and evaporated in the form of water ($H_2O$), so that iron element (Fe) was left in the surface of the body material 20'.

Figure 7:
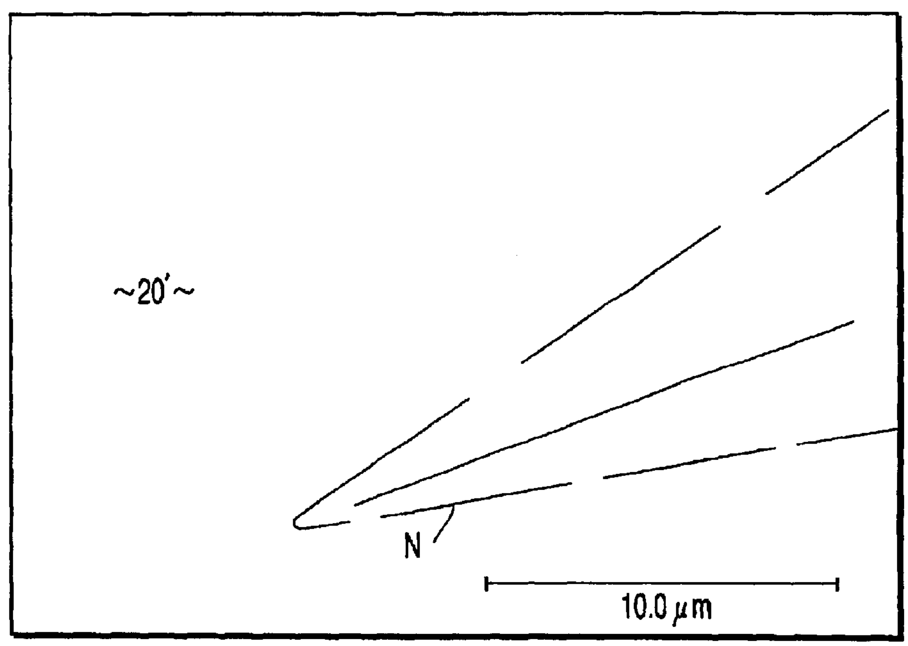
FIG. 7 is an enlarged view showing the surface of the polished body material after the heat treatment.

It was confirmed that the iron left in the surface of the body material 20' (e.g., austenitic stainless steel) were dispersed into the body material 20' in the heat treatment for solid solution and disappeared from the surface of the body material 20', as shown in FIG. 7. Knoop impressions N are formed by a lozenge diamond indenter on the surface of the body material 20' shown in FIGS. 6 and 7 in order that the position for microscopic observation can be specified.

Figure 8:
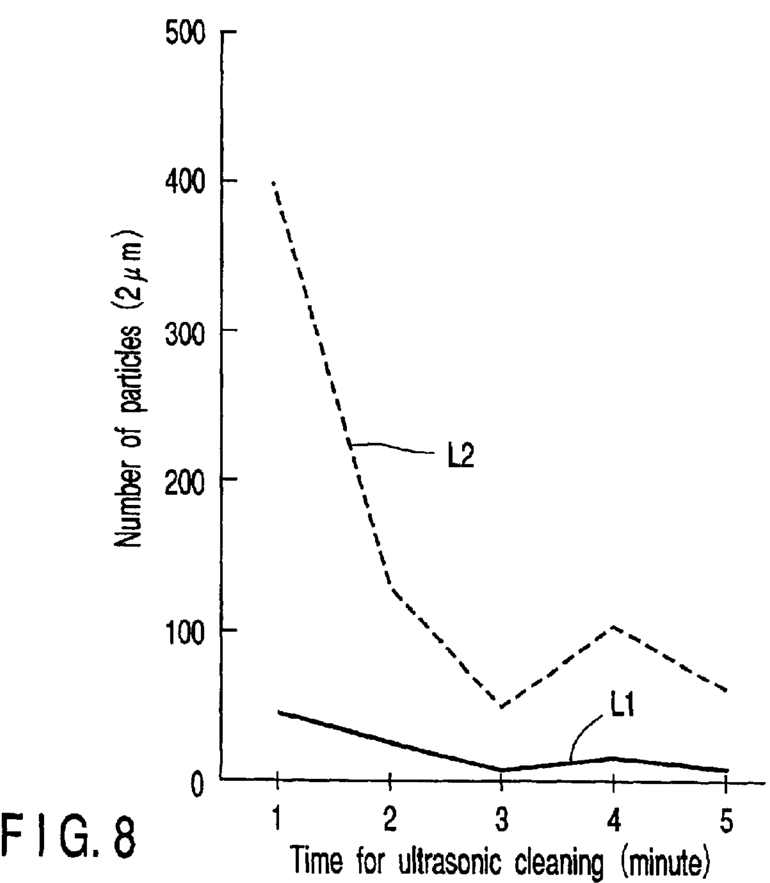
FIG. 8 is a diagram showing the way a heat-treated base plate and one not heat-treated produce dust with the passage of cleaning time.

The base plate 20 heat-treated in the heat treatment process S4 were subjected to ultrasonic cleaning, and a test was conducted to count particles in a liquid. FIG. 8 shows the result of the test. In FIG. 8, the axes of abscissa and ordinate represent the time for ultrasonic cleaning (minute) and the number of particles, respectively. In FIG. 8, a measured value L1 represents the number of particles in the heat-treated base plate 20 that is subjected to the heat treatment process S4. A measured value L2 represents the number of particles in a conventional base plate that is not subjected to the heat treatment process S4.

The number of particles in FIG. 8 is significant after the base plate 20 is cleaned for 3 minutes. This is because if the particles can be counted after 3 minutes or more of cleaning operation, it is implied that the particles stuck in the surface of the component fall from the surface at random. Thus, the smaller the measured value, the higher the reliability of the disc drive can be. It was confirmed that the quantity of dust from the heat-treated component (e.g., base plate) that is subjected to the heat treatment process S4 was much smaller than the quantity of dust from the conventional base plate, as shown in FIG. 8.

In the case of an iron component that is formed of austenitic stainless steel, the temperature range from 800° C. to 1,100° C. in which the reducing atmosphere can be obtained with ease is coincident with a general heat treatment temperature range for austenitic stainless steel. Therefore, the effect of the present invention can be enjoyed without using any special equipment. Since austenitic stainless steel is insensitive to the cooling speed, moreover, the effect of the invention can be fulfilled without sacrificing other merits of austenitic stainless steel by only keeping the reducing atmosphere at an increased temperature. Components that are formed of various steel materials, such as martensitic stainless steel, ferritic stainless steel, etc., are sensitive to the heat treatment temperature and cooling speed. In some cases, therefore, the mechanical strength or the like of the components may change considerably. If this change is allowable, any other types of steel can produce the same dust restraining effect of austenitic stainless steel.

It is to be understood, in carrying out the present invention based on the embodiment described above, that the constituent elements of the invention, including the respective configurations of the iron component and abrasive grains, the mode of the heat treatment process, etc. may be variously changed or modified by one skilled in the art without departing from the spirit or scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An iron component comprising:

ferric iron body material formed having a given shape and polished, an oxide in the constituents of fragments of an oxide abrasive material consisting essentially of ferric oxide in and near the surface of the body material being reduced so that iron is dispersed into the body material.

2. An iron component according to claim 1, wherein said iron body material forms a stainless-steel component stored in a casing of a disc drive.

3. A method for manufacturing an iron component, comprising:

a polishing process of polishing the surface of an iron body material having a given shape by means of an abrasive material containing ferric oxide; and a heat treatment process of heating the body material in a reducing atmosphere after the polishing process, thereby reducing an oxide in the constituents of fragments of the abrasive material in and near the surface of the body material and leaving iron, and keeping the body material at a temperature for dispersion the iron into the body material.

4. A method for manufacturing an iron component according to claim 3, wherein said iron body material forms a stainless-steel component stored in a casing of a disc drive.

5. A method for manufacturing an iron component according to claim 4, wherein said iron body material is austenitic stainless steel.

6. A hard disc drive comprising:

ferric iron component including an iron body material formed having a given shape and polished, an oxide in the constituents of fragments of an oxide abrasive material consisting essentially of ferric oxide in and near the surface of the body material being reduced so that iron is dispersed into the body material, the iron component being stored in a casing.

* * * * *